United States Patent
Aragones et al.

(10) Patent No.: US 7,457,786 B2
(45) Date of Patent: Nov. 25, 2008

(54) PERFORMANCE ENHANCEMENT OF OPTIMIZATION PROCESSES

(75) Inventors: James Kenneth Aragones, Clifton Park, NY (US); Naresh Sundaram Iyer, Clifton Park, NY (US); Catherine Joyce Lazatin, Mt. Prospect, IL (US)

(73) Assignee: General Electric Company, Niskayuna, NY (US)

( * ) Notice: Subject to any disclaimer, the term of this patent is extended or adjusted under 35 U.S.C. 154(b) by 443 days.

(21) Appl. No.: 11/210,120

(22) Filed: Aug. 23, 2005

(65) Prior Publication Data

US 2007/0094162 A1  Apr. 26, 2007

(51) Int. Cl.
G06F 15/18 (2006.01)
G06F 17/00 (2006.01)
G06N 3/00 (2006.01)
G06N 3/12 (2006.01)
G06N 5/02 (2006.01)

(52) U.S. Cl. .......................... 706/13; 706/45

(58) Field of Classification Search ............... 706/13, 706/45
See application file for complete search history.

(56) References Cited

U.S. PATENT DOCUMENTS 6,799,154 B1  9/2004  Aragones et al.

OTHER PUBLICATIONS

James K. Aragones et al., "Systems and Methods for Managing an Assett Inventory," U.S. Appl. No. 11/095,242, filed Jul. 20, 2004.

Primary Examiner—David Vincent
Assistant Examiner—Benjamin Buss
(74) Attorney, Agent, or Firm—Penny A. Clarke

(57) ABSTRACT

The performance of optimization algorithms operating with compute-intensive fitness functions is enhanced by constraining time-intensive fitness evaluations for candidate solutions that show low likelihood of being fit at early stages of the fitness evaluation. By prematurely discarding alternatives that could be potentially optimal upon complete fitness evaluation but with low likelihood, the running time of the overall optimization process is advantageously reduced substantially, thereby trading off time complexity for search fidelity.

8 Claims, 3 Drawing Sheets

PERFORMANCE ENHANCEMENT OF OPTIMIZATION PROCESSES

BACKGROUND OF THE INVENTION

This disclosure relates generally to optimization processes and, more particularly, to enhancing the performance of time-intensive optimization processes.

Optimization processes are widely used to develop operational strategies in a variety of settings. In many cases, the problem to be optimized cannot be completely controlled, and experiments are run on simulated problems. The simulations can be used to produce performance evaluations for the operational strategy at hand. In many instances, the simulations can be very complex, thereby requiring large amounts of time to evaluate the operational strategies being considered.

For example, in some instances, an appropriate optimization algorithm might take thousands of hours to reasonably explore the space of possible strategies and determine an optimal strategy. Various techniques have been used to reduce the run time of such time-intensive optimization processes. For example, in some cases, the model used to simulate the problem is simplified or the detail of the strategy evaluations is reduced. Although these techniques can improve the run time of the optimization process, they can also lead to sub-optimal solutions of the optimization problem at hand.

Another approach is to utilize numerous processors performing calculations in parallel to reduce the amount of time required to explore the space of possible strategies and determine an optimal strategy. A drawback of this approach is that it can often be cost-prohibitive to utilize a sufficient number of processors to explore the solution space in a reasonable amount of time. Accordingly, additional search heuristics that can improve the performance of the optimization processes are desirable.

BRIEF DESCRIPTION

The above-mentioned drawbacks associated with existing optimization processes are addressed by embodiments of the present invention, which will be understood by reading and studying the following specification.

In one embodiment, a method of performing an optimization process comprises conducting a preliminary evaluation of a selected candidate solution and determining whether the result of the preliminary evaluation satisfies one or more current selection criteria. If so, then a complete evaluation of the selected candidate solution is conducted. The method further comprises determining whether the result of the complete evaluation, if performed, is better than an existing optimal solution, and if the result of the complete evaluation is better than the existing optimal solution, storing the selected candidate solution as a new optimal solution and updating the one or more selection criteria based on the new optimal solution.

In another embodiment, an optimization system comprises a processor, a simulation module in communication with the processor, and an optimization module in communication with the processor and the simulation module. The optimization module is configured to execute an iterative optimization process including a fitness function. The fitness function can trade off search fidelity for execution speed by evaluating the likelihood that a candidate solution will improve on a current optimal solution and, if so, evaluating the candidate solution at a first speed and at a first fidelity, but if not, evaluating the candidate solution at a second speed and at a second fidelity. The first speed is slower than the second speed, and the first fidelity is greater than the second fidelity.

In another embodiment, a computer-readable medium stores computer instructions which, when executed on a computer system, enhance the performance of an optimization process. The computer instructions comprise conducting a preliminary evaluation of a selected candidate solution and determining whether the result of the preliminary evaluation satisfies one or more current selection criteria. If so, then a complete evaluation of the selected candidate solution is conducted. The computer instructions further comprises determining whether the result of the complete evaluation, if performed, is better than an existing optimal solution, and if the result of the complete evaluation is better than the existing optimal solution, storing the selected candidate solution as a new optimal solution and updating the one or more selection criteria based on the new optimal solution.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the spirit and scope of the present invention. The following detailed description is, therefore, not to be taken in a limiting sense.

Figure 1:
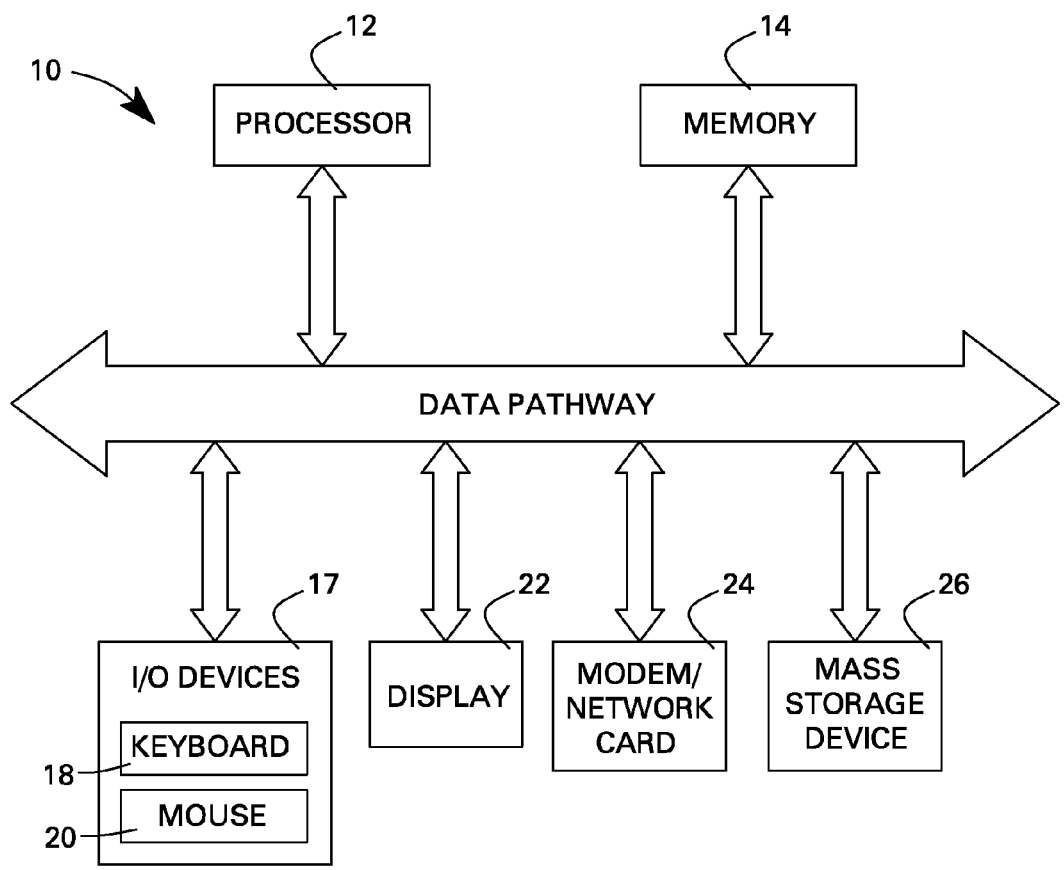
FIG. 1 shows a schematic of a general purpose computer system in which a system for enhancing the performance of an optimization process can operate.

FIG. 1 shows a schematic of a general-purpose computer system 10 in which a system for enhancing the performance of an optimization process can operate. The computer system 10 generally comprises a processor 12, a memory 14, input/output devices 17, and data pathways (e.g., buses) 16 connecting processor 12, memory 14 and input/output devices 17. The processor 12 accepts instructions and data from the memory 14 and performs various calculations. The processor 12 includes an arithmetic logic unit (ALU) that performs arithmetic and logical operations and a control unit that extracts instructions from memory 14 and decodes and executes them, calling on the ALU when necessary. The memory 14 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, the memory 14 preferably contains an operating system, which executes on the processor 12. The operating system performs basic tasks that include recognizing input, sending output to output devices, keeping track of files and directories and controlling various peripheral devices.

In the illustrated embodiment, the input/output devices 17 comprise a keyboard 18 and a mouse 20 that enter data and instructions into the computer system 10. A display 22 allows a user to see what the computer has accomplished. Other exemplary output devices could include a printer, plotter, synthesizer and speakers. A modem or network card 24 enables the computer system 10 to access other computers and resources on a network. A mass storage device 26 allows the computer system 10 to permanently retain large amounts of data. The mass storage device may include any suitable disk drive, such as floppy disk drives, hard disk drives and optical disk drives, as well as tape drives that can read and write data onto a tape that could include digital audio tapes (DAT), digital linear tapes (DLT), or other magnetically coded media. The above-described computer system 10 can take the form of, for example, a hand-held digital computer, personal digital assistant computer, personal computer, workstation, mini-computer, mainframe computer or supercomputer.

Figure 2:
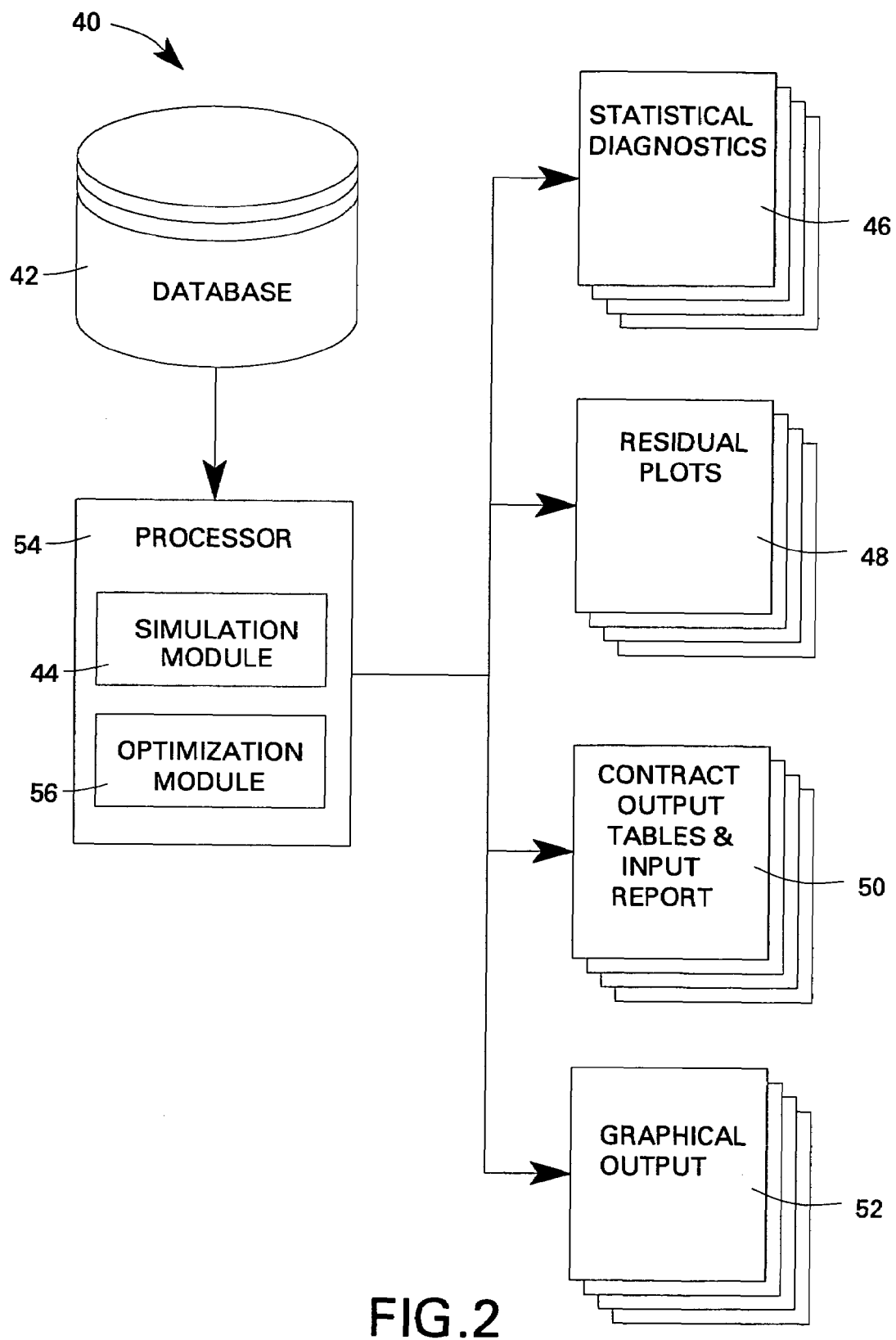
FIG. 2 shows a schematic diagram of a simulation system that operates on the computer system shown in FIG. 1.

FIG. 2 shows a schematic diagram of one embodiment of a simulation system 40 that can operate on the computer system 10 shown in FIG. 1. In the illustrated embodiment, the simulation system 40 is used to predict the timing and costs of future service events of a product, such as an aircraft engine, locomotive, power system, or any other electrical, chemical or mechanical product where it is desirable to predict the timing and costs of future service events.

In alternative embodiments, other simulation systems can be used to develop computer models and predict events in a wide variety of applications. To provide some examples, simulation systems can be used in the following applications: automated design of mechanical components, configuration of molecular structures, container loading optimization, distributed computer network topologies, electronic circuit design, file allocation for distributed systems, game theory equilibrium resolution, learning robot behavior, mobile communications infrastructure optimization, multiple population topologies and interchange methodologies, protein folding and protein/ligand docking, tactical asset allocation and equity strategies, timetabling and scheduling, and plant floor layout. Many other possible applications will become apparent to those of ordinary skill in the art.

For purposes of illustration in this disclosure, the simulation system 40 shown in FIG. 2, which is used to predict the timing and costs of future service events of a product, will be described, and the product will be described with reference to an aircraft engine. The simulation system 40 can be used to develop a maintenance strategy for a fleet of aircraft engines and to manage a spare engine inventory for the fleet of engines, for example. Similar systems are described in U.S. Pat. No. 6,799,154, entitled System and Method for Predicting the Timing of Future Service Events of a Product, issued Sep. 28, 2004, and U.S. patent application Ser. No. 11/095, 242, entitled Systems and Methods for Managing an Asset Inventory, filed Mar. 31, 2005, and these documents are incorporated herein by reference in their entireties.

In the embodiment illustrated in FIG. 2, the simulation system 40 includes a database 42 having data related to engines for a spare engine inventory. In addition, the system 40 includes a processor 44 that facilitates analysis of the stored data, to predict timing and cost of service events for a fleet of engines and to estimate a total number of spare engines required by the spare engine inventory over a time period. By way of example, the processor 44, in cooperation with various algorithms, may determine failure models that provide an indication of the spare engine needs for a given fleet. Also, the processor 44 can facilitate allocation of the spare engine inventory between a first number of owned engines and a second number of leased engines to substantially reduce a cost of maintaining the total number of spare engines.

In one configuration, the database 42 contains data related to an aircraft engine. Generally, such data includes information such as compartment definitions of the engine, repair history of the engine, environment, operating conditions of the engine, and engine life, among others. As used herein, the term "compartment definition" refers to a physical or performance related subsystem of the engine, which, when it fails, suggests that the engine needs maintenance or servicing. In addition, the database 42 may include data such as engine utilization, engine lease acquisition cost, engine repair cost, engine maintenance turnaround time, engine transport time, engine depreciation, engine purchase cost, engine storage cost, engine ownership cost and contract terms.

In some embodiments, the plurality of data mentioned above are stored via a memory device that includes a random-access memory (RAM) and a read-only memory (ROM). In other embodiments, other types of memory such as programmable read-only memory (PROM), erasable read-only memory (EPROM) and electrically erasable programmable read-only memory (EEPROM) may be employed for storing the data.

Typically, the processor 44 preprocesses the data from the database 42 to generate data in a pre-determined format. In certain embodiments, the preprocessing includes extracting the data from the database 42, assigning each data record in the database 42 to a compartment depending upon various factors such as removal cause, failure mode and so forth. The formatted data may then be analyzed to estimate a total number of engines required by the spare engine inventory over a time period based upon the obtained data. It should be noted that the total number of engines required by the spare engine inventory depends upon failure rate distributions of the components of the engine that are estimated by the processor 44.

The processor 44 facilitates determination of a plurality of compartment failure data that may include compartment failure parameters and compartment time-to-failure coefficients. As used herein, the term "compartment failure parameters" includes variables that affect the time required for a component of the engine to be serviced. In addition, as used herein, the term "compartment time-to-failure coefficients" includes coefficients that are applied to each of the compartment failure parameters. Based upon the estimated compartment failure parameters and the compartment time-to-failure coefficients, the processor 44 estimates failure rate distributions for the components of the engine.

In certain embodiments, the processor 44 may cooperate with a statistical analyzer to analyze the data and to execute a plurality of statistical procedures to determine a plurality of compartment failure information, such as statistical diagnostics 46 and residual plots 48. Examples of statistical procedures include multi-variate regression and correlation analysis. The statistical diagnostics 46 may include the compartment time-to-failure coefficients for each compartment associated with the engine. Further, the residual plots 48 enable a user of the system 40 to determine how well the regression model fits into the obtained data, for example.

In the illustrated embodiment, the processor 44 comprises a simulation module 54 that is configured to forecast failure of the components of the engine. In other embodiments, the simulation module 54 may be separate from the processor 44. In operation, the processor 44 cooperates with the simulation module 54 to forecast engine component failures over a given time period based upon the estimated failure rate distributions of the components.

For example, in some embodiments, the simulation module 54 utilizes the compartment time-to-failure coefficients and determines a Weibull distribution for each compartment, and such distributions may be employed to determine the overall distribution of the engine. In one embodiment, the simulation module 54 employs an event driven Monte Carlo simulation. As a result of the simulation, the simulation module 54 generates several outputs such as a contract output report 50 and a graphical output 52. The contract output report 50 may include a plurality of information such as maintenance event distribution parameters over the time period, maintenance cost distribution over the time period, demand distributions and so forth. Further, the graphical output may include cost distributions, availability, reliability and other financial information. Thus, from the estimated outputs from the processor 44, information pertaining to various parameters of the components of the engine may be made available to a user of the system 40. Further, this information may be used for managing a spare engine inventory.

In the illustrated embodiment, the processor 44 also comprises an optimization module 56. In other embodiments, the optimization module 56 may be separate from the processor 44. In operation, the optimization module 56 works in cooperation with the processor 44 and the simulation module 54 to evaluate numerous possible strategies for maintaining the fleet of aircraft engines and to determine an optimal maintenance strategy. For example, in some embodiments, the optimization module 56 performs an iterative optimization process, such as a genetic algorithm or a gradient search algorithm, to search the parameter space for a set of values that minimize a particular fitness function. For purposes of illustration in this disclosure, the optimization module 56 will be described primarily as performing a genetic algorithm.

As will be understood by those of ordinary skill in the art, genetic algorithms comprise a well-known class of general optimization techniques which are intended to find the global minimum of multi-modal, multi-parameter functions by emulating the process of natural selection. Genetic algorithms are typically implemented as computer simulations in which a population of abstract representations (called chromosomes) of candidate solutions (called individuals) to an optimization problem "evolve" toward better solutions using biologically-derived concepts such as inheritance, mutation, natural selection, and recombination. The evolution typically starts from a population of random individuals and happens in generations. In each generation, the fitness of the population is evaluated, multiple individuals are stochastically selected from the current population based on their fitness, and the selected individuals are modified (e.g., mutated or recombined) to form a new population, which becomes current in the next iteration of the algorithm.

Additional information about genetic algorithms, including details regarding the implementation of such algorithms, is available from a variety of sources, including the following references: Goldberg, David E., Genetic Algorithms in Search, Optimization and Machine Learning, Addison-Wesley Professional (1989); Mitchell, Melanie, An Introduction to Genetic Algorithms, The MIT Press (1996).

In some embodiments, the simulation model used in the optimization process can be quite complex, involving many variables and very large numbers of possible candidate solutions. In such cases, due to the complexity of the simulation model, it is often time-consuming to conduct a complete evaluation of even a single candidate solution. For example, in the exemplary embodiments described above, the simulation model may comprise about 200 variables that can be adjusted simultaneously, and it can take about an hour to fully evaluate a given candidate solution.

In addition, the number of possible candidate solutions to a given optimization problem is often very large (e.g., hundreds of thousands or millions of possibilities). Therefore, it is typically infeasible to spend the time that would be required to fully explore the parameter space of possible candidate solutions by conducting a complete evaluation of every possible solution. Accordingly, in the present technique, the optimization module 56 is configured to explore the parameter space more efficiently by intelligently selecting only certain candidate solutions for complete evaluations during the execution of the optimization process.

Figure 3:
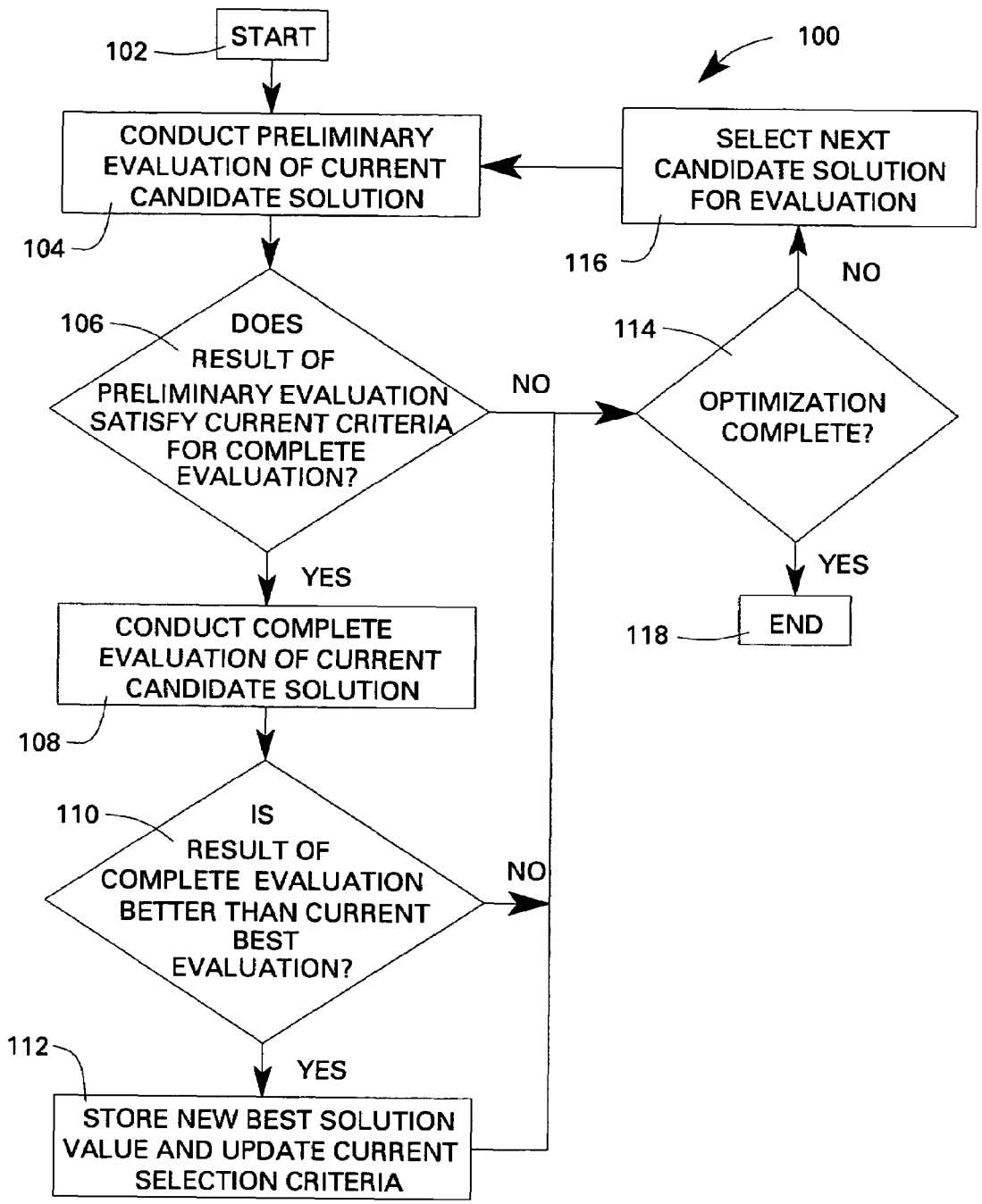
FIG. 3 shows a flow chart describing actions performed by the optimization module shown in FIG. 2.

FIG. 3 is a flow chart illustrating an exemplary process 100 performed by the optimization module 56. In a first step 102, the process 100 begins. In a next step 104, a preliminary evaluation of a given candidate solution to the optimization problem is performed using an appropriate fitness function. The preliminary evaluation preferably takes only a fraction, such as 20% or, more preferably, 10% or less of the time that it would take to perform a complete evaluation of the candidate solution. For example, in some embodiments, a complete evaluation of a given candidate solution may take about an hour, whereas a preliminary evaluation of the candidate solution may take about five to ten minutes.

The preliminary evaluation may comprise any suitable evaluation that enables the fitness function to determine the likelihood that the candidate solution will be an improvement over the best solution found so far. For example, the preliminary evaluation may be based on factors such as a fitness rating of the candidate solution within a selected range of that of the current optimal solution, a minimum threshold fitness rating, etc. In some embodiments, this approach enables the optimization module 56 to focus on candidate solutions that are likely to improve on the current optimal solution and to avoid wasting time on candidate solutions that show little or no promise of improving over the best solution found so far. In other embodiments, the optimization module 56 may utilize the results of the preliminary evaluation to limit the time spent evaluating candidate solutions that are significantly better than the current optimal solution.

In a step 106, a decision is made as to whether the result of the preliminary evaluation satisfies the current criteria for a complete evaluation of the candidate solution. These criteria are often used to filter out candidate solutions that are unlikely to be improvements over the current optimal solution. The criteria typically become more and more selective as the optimization process progresses and better and better solutions are found. For example, in some embodiments, the optimization process comprises a genetic algorithm, and the preliminary evaluation criteria become more and more selective in successive generations of the algorithm.

If the result of the preliminary evaluation satisfies the current selection criteria, then in a step 108, a complete evaluation of the candidate solution is performed using an appropriate fitness function. As discussed above, such complete evaluations can be relatively time-consuming. Nevertheless, as the optimization process progresses and the criteria become more and more selective, fewer and fewer complete evaluations are required. As a result, the optimization module 56 can advantageously explore the solution space more efficiently than conventional optimization systems.

In a step 110, a determination is made as to whether the result of the complete evaluation, i.e., the fitness rating of the current candidate solution, is better than that of the current optimal solution. If so, then in a step 112, the current candidate solution is stored as the new optimal solution, and the selection criteria used during the preliminary evaluation steps may be updated to become more selective, based on the new optimal solution. If not, the current candidate solution is discarded and, during a step 114, a decision is made as to whether the optimization process is complete. If during step 106 it is determined that the result of the preliminary evaluation does not satisfy the current selection criteria, then the process proceeds to step 114 without performing a complete evaluation of the candidate solution, as described above.

The decision made during step 114 may be based upon a number of factors, such as the number of candidate solutions considered so far, the length of time elapsed since the optimization process began, the fitness rating of the current optimal solution, etc. If the optimization process is not yet complete, then in a step 116, the next candidate solution is selected for evaluation and another iteration of the optimization process is performed. Once the optimization process is complete, the process ends at step 118.

The systems and methods described above present a number of distinct advantages over conventional optimization techniques. For example, in the above-described systems, the fitness function is advantageously enabled to trade off search fidelity for execution speed. An iterative optimization process, such as a genetic algorithm, can pass precision constraints to the fitness function, and evaluations can be directed to run faster at lower fidelity if they are unlikely to improve the current optimal solution or to run slower at higher fidelity if they are likely to improve the current optimal solution.

As an example, if the solution space comprises N possible candidate solutions, each candidate solution has a probability of 1/N of being optimal. In a simple case, where the genetic algorithm population size is one, the ith alternative solution evaluated has a probability of 1/i of being better than the optimal solution found already. If a complete fitness evaluation for one candidate solution takes time t, then the total time required to evaluate N alternative solutions using conventional optimization techniques is typically t×N. Using the systems and methods described above, however, the time required to perform a preliminary evaluation, or fitness estimation, of a candidate solution may be ext, where e is the estimator speed. In this scenario, the total time, T, required to explore the solution space can be determined using the following equation:

$$T = \sum_{i=1}^{N} \left[ et\left(1 - \frac{1}{i}\right) + (1 + e)t\left(\frac{1}{e}\right) \right].$$

This equation can be simplified to approximate T, as follows:

$$T \approx [eN + \ln(N)]t.$$

From this equation, the average fractional time spent evaluating a candidate solution, $t_f$, can be determined using the following equation:

$$t_f = e + \frac{\ln(N)}{N}.$$

If N is large, then ln(N)/N is very small, and the estimator speed, e, is the primary variable affecting $t_f$ and, hence, the overall performance of the optimization system. This typically leads to a substantial improvement over conventional optimization techniques in the amount of time required to explore the solution space and find an optimal solution, as discussed above.

The above-described systems and methods for enhancing the performance of optimization processes comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium may comprise, but is not limited to, an electronic, magnetic, optical, electromagnetic, or infrared system, apparatus, or device. An illustrative, but non-exhaustive list of computer-readable media can include an electrical connection (electronic medium) having one or more wires, a portable computer diskette (magnetic medium), a random access memory (RAM) (magnetic medium), a read-only memory (ROM) (magnetic medium), an erasable programmable read-only memory (EPROM or Flash memory) (magnetic medium), an optical fiber (optical medium), and a portable compact disc read-only memory (CDROM) (optical medium). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. An optimization system comprising:
   a processor;
   a simulation module in communication with the processor; and
   an optimization module in communication with the processor and the simulation module, the optimization module being configured to execute an iterative optimization process including a fitness function,
   wherein the fitness function can trade off search fidelity for execution speed by evaluating the likelihood that a candidate solution will improve on a current optimal solution and, if so, evaluating the candidate solution at a first speed and at a first fidelity, but if not, evaluating the candidate solution at a second speed and at a second fidelity, the first speed being slower than the second speed, and the first fidelity being greater than the second fidelity,
   wherein the simulation module is configured to predict the timing and costs of future service events of a fleet of aircraft engines, and the optimization system is configured to determine an optimal maintenance strategy for the fleet of aircraft engines.

2. The optimization system of claim 1, wherein the iterative optimization process comprises a genetic algorithm.

3. The optimization system of claim 1, wherein candidate solutions evaluated at the second speed and fidelity are evaluated at least 5 times faster than candidate solutions evaluated at the first speed and fidelity.

4. The optimization system of claim 1, further comprising a database storing information about a system modeled by the simulation module.

5. The optimization system of claim 1, wherein the simulation module is configured to perform a Monte Carlo simulation.

6. The optimization system of claim 1, further comprising a database storing compartment definitions, repair history and service factors regarding the fleet of aircraft engines.

7. The optimization system of claim 1, wherein the simulation module determines estimated time-to-failure distributions for a plurality of compartments within the fleet of aircraft engines.

8. The optimization system of claim 7, wherein the simulation module uses the estimated time-to-failure distributions to determine a Weibull distribution for a subset of the plurality of compartments.

* * * * *